Jan. 18, 1949.  C. A. SAWTELLE  2,459,394
LIQUID PRESSURE BRAKE MECHANISM
Filed June 7, 1944  2 Sheets-Sheet 2

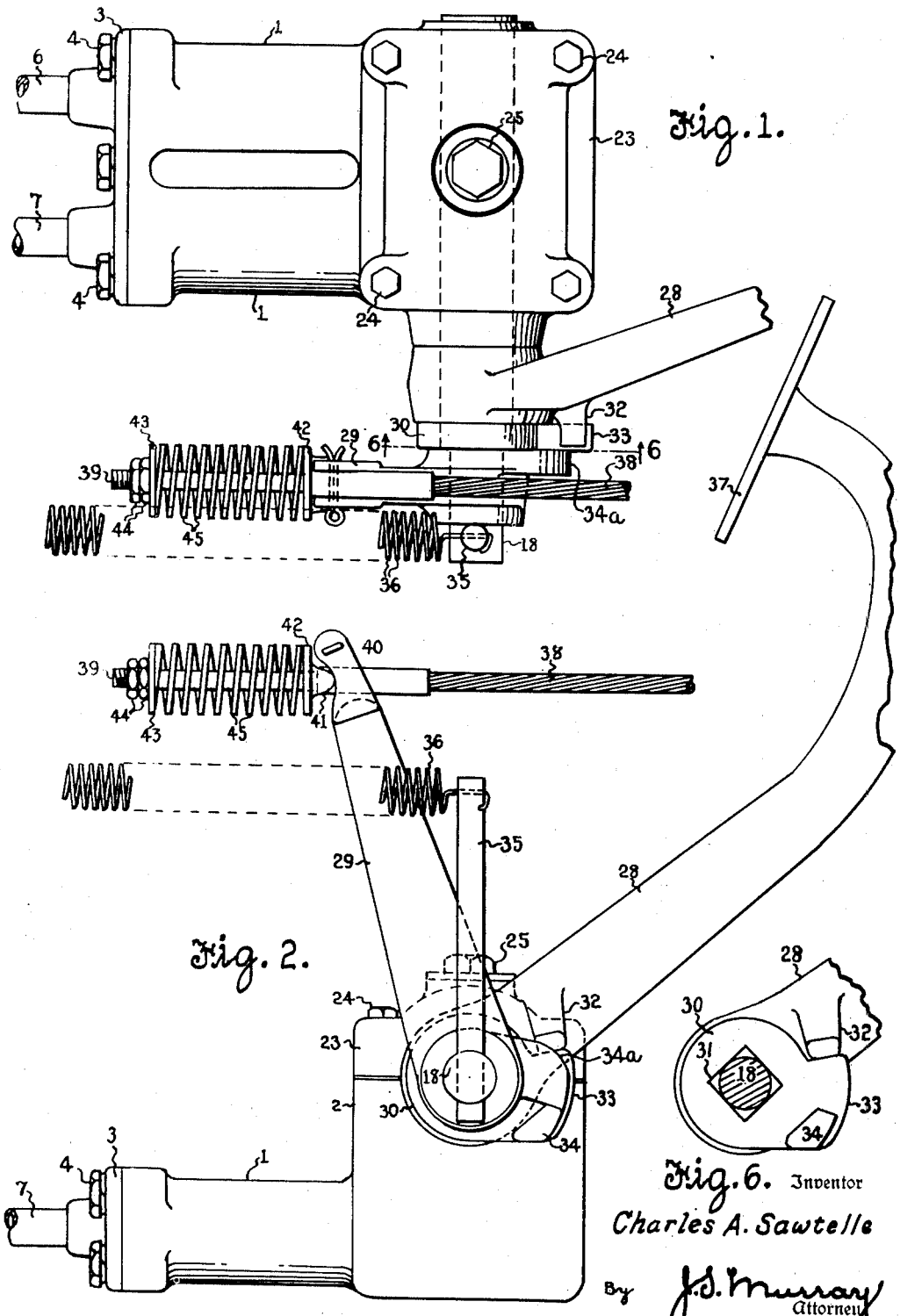

Inventor
Charles A. Sawtelle
J. S. Murray
Attorney

Patented Jan. 18, 1949

2,459,394

UNITED STATES PATENT OFFICE 2,459,394

LIQUID PRESSURE BRAKE MECHANISM

Charles A. Sawtelle, Rosedale Gardens, Mich.

Application June 7, 1944, Serial No. 539,101

5 Claims. (Cl. 74—99)

This invention relates to vehicle brakes and particularly brakes operable by fluid pressure.

In vehicle fluid braking systems now common, the ducts through which pressure is applied to the front and rear wheel brakes are intercommunicating, so that a material leak in any part of the system results in a complete loss of braking control.

An object of the invention is to provide for independently transmitting fluid pressure to the front and rear pairs of brakes of a vehicle, so that failure of one of these pairs will not necessarily entail a complete loss of braking control.

Another object is to employ two fluid pressure systems for the brakes of a vehicle and independent pistons applying a pressure in such systems, and to actuate such pistons in common by a mechanism compensating for any slight differential in the fluid volumes acted upon by the pistons.

Another object is to automatically connect a fluid pressure braking system with a fluid reservoir when pressure in such system is relieved and to close such connection when pressure is applied, so that upon relief of pressure there may be an immediate leakage compensation.

Another object is to provide an improved mechanism adapting either of two pressure-applying arms to actuate a rock shaft for brake-applying purposes without disturbance of either arm by the other.

Another object is to strongly compress a spring in effecting a parking application of brakes under fluid pressure so that such spring may expansively compensate for a material fluid leakage from the system, thus avoiding at least a partial failure of the brakes.

These and various other objects are attained by the construction hereinafter described and illustrated in the accompanying drawings, wherein:

Fig. 1 is a top plan view of a duplex master cylinder fluid brake control mechanism.

Fig. 2 is a side elevational view of said mechanism.

Fig. 6 is a cross section taken on the line 6—6 of Fig. 1.

Figure 3:
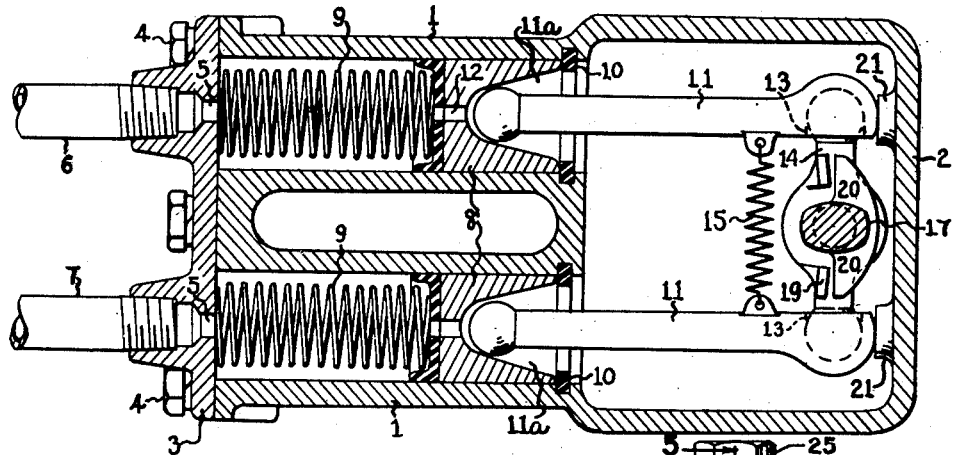
Fig. 3 is a horizontal sectional view of said mechanism taken on the line 3—3 of Fig. 2.
Figure 4:
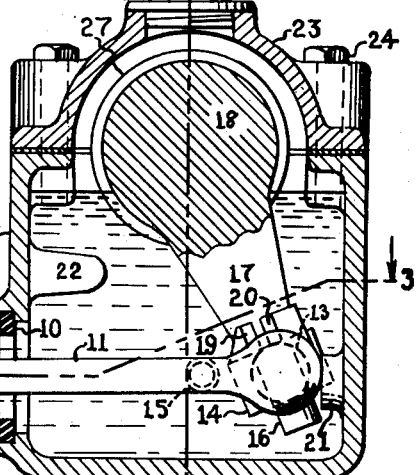
Fig. 4 is a vertical sectional view of said mechanism taken on the line 4—4 of Fig. 5.
Figure 5:
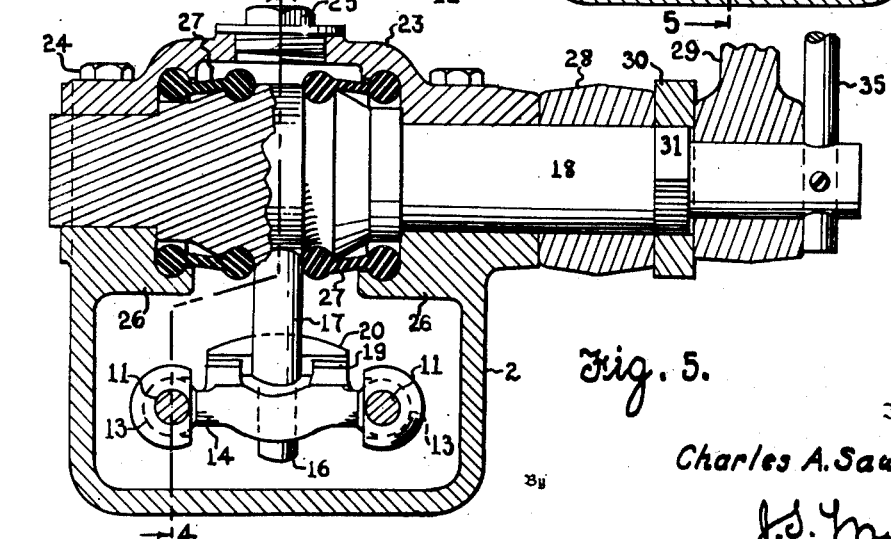
Fig. 5 is a vertical sectional view taken on the line 5—5 of Fig. 4.

In these views, the reference character 1 designates a pair of duplicate parallel adjacent cylinders communicating with and integrally projecting from a reservoir 2 in which a suitable reserve quantity of oil or some other pressure liquid is stored. A head 3 closing the outer ends of both cylinders is removably attached to the cylinders by cap screws 4 and is formed with ports 5 through which the cylinders communicate with liquid-filled pipes 6 and 7 leading respectively to the front and rear wheel brakes (not shown) of a vehicle. Pistons 8 operating in said cylinders are urged toward the reservoir 2 by coiled springs 9, the spring-induced stroke being limited by annular stops 10, preferably rubber, set into grooves in the cylinder walls. For driving the pistons outwardly, they are engaged by push rods 11 extending through the open ends of the cylinders and having ball heads set into substantially conical recesses 11a in the pistons. Ports 12 open from said recesses centrally through the pistons, being controlled by the push rods as will presently appear. Within the reservoir 2, the push rods have enlarged ends formed with hemispherical sockets 13 engaged by the ball ends of a double-armed lever 14, the push rods being interconnected and stressed toward each other by a coiled spring 15 to maintain their engagement with said lever. The mid portion of the lever is pivoted on the cylindrical free end portion 16 of an arm 17 projecting rigidly and preferably integrally from a rock shaft 18, and pivotal play of the lever is limited, for reasons hereinafter stated, by forming it with a pair of lugs 19 at opposite sides of the lever axis, coacting with and normally spaced slightly from a pair of lugs 20 integral with and oppositely projecting from the arm 17. A normal or non-braking position of the described mechanism is established by engagement of the push rods, at their socket-forming ends, with bosses 21 interiorly projecting from the reservoir 2. Piston-actuating rocking travel of the arm 17 is limited by a stop 22 interiorly projecting from the reservoir to engage said arm. The top of the reservoir is formed by a removable cover plate 23 held in place by cap screws 24 and centrally formed with a fill opening normally closed by a screw plug 25. The shaft 18 is journaled at the juncture of the cover plate with the reservoir in bearings 26 which project into the reservoir, and a pair of sealing sleeves 27, formed preferably of rubber, surround the shaft at each side of the arm 17, their ends being enlarged and beaded to snugly embrace the shaft at the sleeve ends adjacent to the arm and to engage snugly at their other ends within annular recesses in the bearings.

The shaft 18 has an end portion projecting exteriorly of the reservoir to mount lever arms 28 and 29, serving respectively to rock the shaft for service and parking braking. Said arms are loose on the shaft, their drive to the latter being established through a collar 30 disposed between said arms on a squared portion 31 of the shaft. A lug 32 on the arm 28 overlaps the collar 30 to engage a radially projecting drive lug 33 on said collar, and a lateral extension 34 from the lug 33 lies in the swing path of the arm 29, to be driven by the latter. The arms 28 and 29 and the collar 30 are held in proper assembly relation upon the shaft by a pin 35 set into and rigidly projecting from the shaft at its exposed end, such pin further affording leverage to a coiled spring 36 which normally maintains a non-braking position of the shaft determined by engagement of the push rods 11 with the bosses 21. In such position, the arms 28 and 29 are retracted since the collar 30 is fixed on the shaft and compels their retraction.

The free end of the arm 28 (for service braking) carries the usual actuating pedal 37, and from the free end of the arm 29 (for parking braking), a cable 38 extends to the usual control lever (not shown). In connecting said cable to the arm 29, an extension of the cable formed by a rod 39 is engaged between furcations terminally formed on the arm, such furcations having edge indentations 40 wherein are seated a pair of lugs 41 formed on a collar 42 slidable on said rod. Spaced from the collar 42 is a second collar 43 held on the free end portion of the rod by nuts 44, the two collars forming abutments for a coiled spring 45, normally expanded and adapted to undergo a predetermined compression in actuating the arm 29, the stress requisite to effect such compression being in excess of that necessary to a normal parking braking.

Considering now the operation of the described mechanism it is to be first understood that when the arms 28 and 29 are free (or non-actuated) they are held retracted by the coiled spring 36, the latter taking effect through the shaft 18 and collar 30. Engagement of the push rods 11 with the bosses 21 limits rotative response of the shaft to the spring 36, and the pistons 8 are held retracted by the springs 9. Under these conditions the push rods are slightly withdrawn from the piston ports 12, permitting a replenishing flow of liquid through either port from the reservoir, in case there is a depletion of liquid in either the front or rear braking system. Upon braking by actuation of one of the arms 28 and 29, the shaft 18 is rocked through the collar 30, the lug arrangement on the collar and arms being such that neither arm, on actuation, disturbs the other arm. As the arm 17 is swung to impose thrust on the push rods, the lever 14 maintains its transverse relation to said rods, provided that the pistons encounter a like resistance in both cylinders. If, however, the pistons vary slightly as to their working positions, due to any cause, such as a fluid volume differential in the front and rear braking systems, the lever may pivotally adjust itself accordingly. Such adjustment is permitted only, however, in compensation for a quite moderate differential in the piston positions, any considerable pivoting of the lever being prevented by the coacting lugs 19 and 20. When either lug 19 engages the opposed lug 20, the lever can pivot no further, and the two push rods then are driven in unison. This arrangement assures that both pistons will be properly driven, even when there is a serious or perhaps complete depletion of pressure liquid in one of the cylinders. Hence, although there may be a failure, at least to a material extent, of one of the two systems of brakes (front and rear), this will not interfere with proper functioning of the other system. It is, of course, highly desirable to thus safeguard a fluid braking installation against complete failure, since serious accidents can often be avoided if either the front or rear brakes are properly functioning.

Parking brakes are often maintained in applied position for considerable intervals of time, and during such intervals, quite small leaks may cause a considerable fluid depletion. By provision of the spring 45, progressive compensation may be made for such depletion avoiding a material relief of braking pressure.

It will be noted that the mechanism described and shown lends itself to an easy and rapid assembly, this being particularly true of the push rods which are installed without employing fastenings other than the spring interconnecting said rods.

The term "pipes" is used in the following claims in a sufficiently broad sense to include either rigid or flexible pressure lines.

What I claim is:

1. In a liquid pressure brake mechanism, the combination with two substantially parallel cylinders and pistons reciprocable in such cylinders, of springs for retracting the pistons, push rods for advancing the pistons, an actuator for the push rods, a lever pivoted on the actuator and forming arms oppositely projecting from the actuator, such arms having a ball and socket engagement with the push rods, and a tie connection between the push rods maintaining said ball and socket engagement.

2. A liquid pressure brake mechanism as set forth in claim 1, said tie connection comprising a coiled spring interconnecting the push rods.

3. In a liquid pressure brake mechanism as set forth in claim 1, a pair of lugs oppositely projecting from said actuator and a pair of lugs respectively formed on the respective arms of the lever opposed to and engageable with the actuator lugs to limit pivotal play of the lever.

4. In a liquid pressure brake mechanism, the combination with two substantially parallel cylinders and pistons reciprocable in said cylinders, push rods for advancing the pistons, means for actuating the push rods in common, and a spring connection between the push rods holding said rods operatively engaged with the actuating means.

5. In a liquid pressure brake mechanism, the combination with two substantially parallel cylinders and pistons reciprocable in said cylinders, push rods for advancing the pistons having thrust receiving ends respectively formed with sockets opening toward each other, an equalizing lever having extremities pivotally received in said sockets, a spring connection between the push rods, maintaining engagement of said sockets with said lever extremities, and actuating means for the push rods connected to the mid portion of the equalizing lever.

CHARLES A. SAWTELLE.

REFERENCES CITED

The following references are of record in the file of this patent:

UNITED STATES PATENTS

| Number | Name | Date |
|---|---|---|
| 1,567,699 | Bendix | Dec. 29, 1925 |
| 1,786,912 | Madden | Dec. 30, 1930 |
| 1,925,727 | Evans | Sept. 5, 1933 |
| 1,955,180 | Furgason | Apr. 17, 1934 |
| 2,020,465 | Hall | Nov. 12, 1935 |
| 2,038,898 | Goodyear | Apr. 28, 1936 |
| 2,080,687 | Bowen | May 18, 1937 |
| 2,131,459 | Weatherhead, Jr. | Sept. 27, 1938 |
| 2,141,358 | Meeks | Dec. 27, 1938 |
| 2,145,704 | Wood | Jan. 31, 1939 |
| 2,160,074 | La Brie | May 30, 1939 |
| 2,319,368 | Schnell | May 18, 1943 |

FOREIGN PATENTS

| Number | Country | Date |
|---|---|---|
| 342,802 | Great Britain | Feb. 12, 1931 |